April 13, 1965 R. S. GEOCARIS 3,177,843
FROZEN FOOD INDICATOR
Filed Feb. 13, 1964
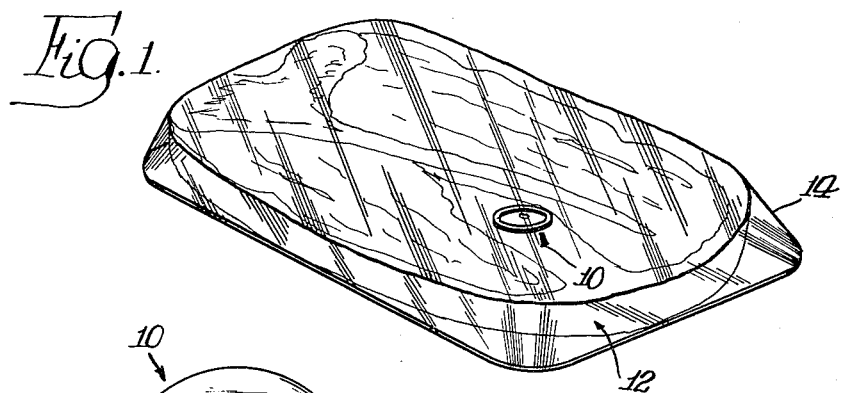
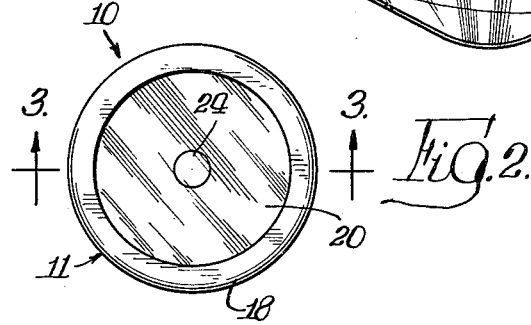
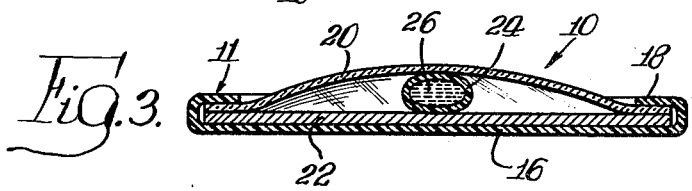
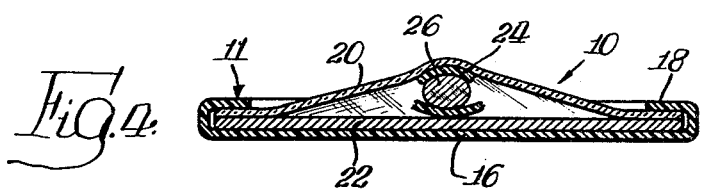
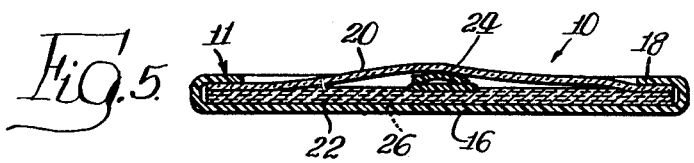
INVENTOR.
Robert S. Geocaris,
BY Brown, Jackson,
Boettcher & Dienner
Attys.

United States Patent Office 3,177,843
Patented Apr. 13, 1965

3,177,843
FROZEN FOOD INDICATOR
Robert S. Geocaris, 2500 S. 15th Ave., Broadview, Ill.
Filed Feb. 13, 1964, Ser. No. 344,588
1 Claim. (Cl. 116—114.5)

My present invention relates generally to a frozen food indicator and more particularly to a visual device for indicating any thawing temperature to which a frozen food package may have been exposed subsequent to initial freezing.

Frozen food products must be maintained frozen, without interruption, until they are to be used by the ultimate consumer. If, through carelessness or failure of refrigeration equipment, frozen food products are subjected to temperatures above the freezing point of 32° F. and thus permitted to thaw at any time between initial freezing and preparation for consumption, deterioration, spoilage, and unfavorable odors and tastes may result. Food products adversely affected in this manner are normally unfit for human consumption. And, refreezing of the product will not ordinarily remove the noted undesirable characteristics caused by thawing.

It is a primary object of my present invention to provide a device that will indicate any thawing temperature to which a frozen food package may have been exposed subsequent to initial freezing.

It is another object of my present invention to provide an indicating device, as described, which will continue to indicate the occurrence of a thawing temperature subsequent to initial freezing even though the food package is refrozen.

It is another object of my present invention to provide an indicating device, as described, which may be interpreted by anyone who can differentiate colors.

It is a further object of my present invention to provide an indicating device, as described, which is simple and yet effective in operation, and which may be readily associated in or on a food package.

It is a further object of my present invention to provide an indicating device, as described, wherein an indicating liquid medium is empolyed which does not come into contact with the food product and which, in any event, is non-toxic.

It is a still further object of my present invention to provide an indicating device, as described, wherein the size, weight and cost thereof are maintained at a minimum, so that use of the device is economically and commercially feasible.

In accomplishing these objects, I proposed to provide an indicator comprising a container having upper and lower wall portions joined at their peripheries, with the upper wall portion being transparent so that the interior of the container may be viewed therethrough. Disposed within the container is absorbent material, which lies along the lower wall portion of the container substantially coextensive therewith, and a frangible capsule, which is held in place between the absorbent material and the upper portion of the container. The capsule is filled with a colored liquid medium. The described indicator is adapted to be associated in or on a food package that is to be frozen. The colored medium, upon freezing concurrently with initial freezing of the food package, causes rupture of the capsule. Thereafter, the ruptured capsule serves to permit the colored medium, upon thawing concurrently with thawing of the food package, to flow from the capsule whereby to be diffused in the absorbent material to give warning of an occurrence of a thawing temperature in the frozen food package at any time subsequent to initial freezing.

Now in order to acquaint those skilled in the art with the manner of making and using frozen food indicators incorporating the principles of my present invention, I shall describe in connection with the accompanying drawing, a preferred embodiment of my invention.

In the drawing:

FIGURE 1 is a perspective view of a frozen food package having associated therewith the indicating device of my present invention;

FIGURE 2 is a plan view, on an enlarged scale, of the indicating device of my present invention;

FIGURE 3 is a median vertical sectional view, on a further enlarged scale, of the indicating device of FIGURE 2, taken substantially along the line 3—3 in FIGURE 2, looking in the direction indicated by the arrows, and shows the elements of the device at a time prior to initial exposure to a freezing temperature;

FIGURE 4 is a median vertical sectional view of my indicating device and shows the elements thereof at the time of initial exposure to a freezing temperature; and FIGURE 5 is a median vertical sectional view of my indicating device and shows the elements thereof at a time after exposure to a thawing temperature subsequent to initial exposure to a freezing temperature.

Referring now to the drawing, there is indicated generally by the reference numeral 10 the visual device of my present invention which serves to indicate any thawing temperature to which a frozen food package may have been exposed subsequent to initial freezing. The indicator 10 has an actual diameter of approximately one inch. As illustrated in FIGURE 1, the indicator 10 may be wrapped with a food product, such as a slice of meat 12, within a transparent wrapper 14. It will be readily appreciated that the indicator 10 may be associated with food products other than meat, and may be suitably attached to the outside of the food wrapper or package as would be necessary in the case of an opaque wrapper or package.

As shown in FIGURES 2 and 3, the indicator 10 includes an envelope-like container 11 comprised of a lower wall portion or base element 16 having an upwardly and inwardly directed peripheral flange portion 18, and an upper wall portion or closure element 20. The peripheral edge portion of the upper wall portion 20 underlies and is suitably affixed or bonded in a conventional manner to the peripheral flange portion 18 of the base element 16 whereby to define an enclosed container. The base element 16 may be fabricated of thin plastic or aluminum sheet, and the upper wall portion 20 may be fabricated of a thin sheet of transparent plastic so that the interior of the container 11 may be viewed therethrough. Although the container 11 is shown to be of circular configuration in plan, it will be understood that containers of other geometric configurations may also be employed.

Disposed within the container 11 is a sheet or layer of absorbent material 22, such as blotting paper, The absorbent material 22 lies along and is supported by the lower wall portion 16 and is substantially coextensive therewith. Also disposed within the container 11 is a frangible thin-walled capsule or pellet 24 which is held in place between the absorbent material 22 and the upper wall portion 20. The capsule 24, which may be fabricated of plastic, is normally filled with a colored liquid medium 26, such as an aqueous solution of food coloring in water, which has a freezing point of about 32° F. For the purpose of providing indication in a manner to be presently described, the medium 26 and the absorbent material 22 are or contrasting colors. By way of illustration, the medium 26 may be read and the absorbent material 22 may be white.

As previously mentioned, the indicator 10 is adapted to be associated in or on a food package containing a food product that is to be maintained frozen, without interruption, until it is to be used by the ultimate consumer. The colored medium 26, upon freezing concurrently with initial freezing of the food package, expands causing rupture of the capsule 24 as shown in FIGURE 4. The elements of the indicator 10 will remain substantially as shown in FIGURE 4, with the medium 26 in a solid state, until the food package and indicator 10 are exposed to a thawing temperature. The ruptured capsule 24 serves to permit the colored medium 26, upon thawing concurrently with thawing of the food package, to flow from the capsule 24. During thawing, the capsule 24 and the container 11 collapse as shown in FIGURE 5. The colored medium 26 flowing from the capsule 24 is diffused in the absorbent material 22 within the container 11 thus giving warning of an occurrence of a thawing temperature in the environment and in the frozen food package at any time subsequent to initial freezing. The absorbent material 22, once having been saturated with the colored medium 26, remains as permanent visual evidence that the frozen food package has been exposed to a thawing temperature and that the food product contained therein may be unsuitable for consumption.

From the foregoing description, it will be readily appreciated that I have provided a visual frozen food temperature indicator which may be readily associated in or on a food package, which is simple and yet effective in operation, which may be interpreted by anyone who can differentiate colors, and which is of minimum size, weight and cost so as to be economically and commercially practical. Due to the simplicity of construction, indicators 10 may be manufactured with existing high-speed, high-volume, production equipment whereby the unit cost may be maintained low enough to be absorbed by the frozen food processor. In addition, once the colored medium 26 has spread through the absorbent material 22 it will continue to indicate the occurrence of a thawing temperature subsequent to initial freezing even though the food package is refrozen. Still further, the liquid medium 26 not only is confined within the container 11 so as not to come into contact with the food product, but also, as a precaution, is non-toxic.

While I have shown and described what I believe to be a preferred embodiment of my present invention, it will be understood by those skilled in the art that various rearrangements and modifications may be made therein without departing from the spirit and scope of my invention.

I claim:

An indicator for a frozen food package, comprising an envelope-like container having a lower wall portion with an upwardly and inwardly directed peripheral flange portion and having an upper wall portion with the peripheral edge portion thereof underlying and being joined to the peripheral flange of said lower wall portion, said upper wall portion being transparent so that the interior of the container may be viewed therethrough, absorbent material in said container and lying along said lower wall portion substantially coextensive therewith, a frangible capsule within said container and held in place between said absorbent material and said upper wall portion, a colored liquid medium in said capsule, said colored medium upon initial freezing causing rupture of said capsule, and said ruptured capsule serving to permit said colored medium upon thawing to flow therefrom whereby to be diffused in said absorbent material to give warning of occurrence of a thawing temperature in the environment at any time subsequent to initial freezing.

References Cited by the Examiner
UNITED STATES PATENTS

| | | | |
|---|---|---|---|
| 2,277,278 | 3/42 | Triplett | 99—192 |
| 2,823,131 | 2/58 | Power | 99—192 |
| 2,850,393 | 9/58 | Romito | 99—192 |
| 2,971,852 | 2/61 | Schulein | 99—192 |
| 3,067,015 | 12/62 | Lawdermilt | 116—114.19 |

LOUIS J. CAPOZI, *Primary Examiner.*